United States Patent [19]
Nii et al.

[11] Patent Number: 5,108,198
[45] Date of Patent: Apr. 28, 1992

[54] MAGNETIC FLUID BEARING APPARATUS AND MOTOR HAVING MAGNETIC FLUID BEARING APPARATUS

[75] Inventors: Katsutoshi Nii, Hitachi; Kazuhiko Kawaike, Katsuta; Jun Matsubayashi, Naka; Satosi Uno, Hitachi, all of Japan

[73] Assignee: Hitachi, Ltd., Tokyo, Japan

[21] Appl. No.: 553,375

[22] Filed: Jul. 17, 1990

[30] Foreign Application Priority Data

Jul. 19, 1989 [JP] Japan .................. 1-184671

[51] Int. Cl.$^5$ .................. F16C 33/82; F16J 15/40
[52] U.S. Cl. .................. 384/133; 277/80
[58] Field of Search ............... 384/130, 133, 132, 446; 277/80, 135

[56] References Cited

U.S. PATENT DOCUMENTS

| | | | |
|---|---|---|---|
| 4,526,484 | 7/1985 | Stahl et al. | 384/133 |
| 4,598,914 | 7/1986 | Furumura et al. | 384/133 X |
| 4,630,943 | 12/1986 | Stahl et al. | 384/133 |
| 4,673,997 | 6/1987 | Gowda et al. | 277/80 X |
| 4,694,213 | 9/1987 | Gowda et al. | 384/133 X |
| 4,938,611 | 7/1990 | Nii et al. | 384/133 |

FOREIGN PATENT DOCUMENTS 210560 9/1986 Japan .

Primary Examiner—Thomas R. Hannon
Attorney, Agent, or Firm—Antonelli, Terry & Stout & Kraus

[57] ABSTRACT

A sliding bearing an an end ring are mounted on a housing. A magnetic fluid sealing member comprises a permanent magnet and a magnetic fluid. A space is formed between the magnetic fluid sealing member and a lubricating fluid. A shaft has projection member or the end ring forms a spiral groove on an inner peripheral portion. The projection member of the shaft or the spiral groove of the end ring is disposed in an opposite position of the magnetic fluid sealing member. A magnetic fluid flow is disturbed by the projection member of the shaft or the spiral groove of the end ring according to a rotation of the shaft, then a magnetic fluid film is destructed instantaneously and the pressure at the space lowers. Air in the space is discharged from the housing. The scatter degree of the magnetic fluid is made slightly.

13 Claims, 6 Drawing Sheets

MAGNETIC FLUID BEARING APPARATUS AND MOTOR HAVING MAGNETIC FLUID BEARING APPARATUS

BACKGROUND OF THE INVENTION

The present invention relates to a magnetic fluid bearing apparatus and a motor having a magnetic fluid bearing apparatus and, more particularly, to a magnetic fluid bearing apparatus employing a lubricating fluid such as a magnetic fluid and a lubricating oil and a motor having a magnetic fluid bearing apparatus in which no oil leakage is permitted to be discharged from a portion of the magnetic fluid bearing apparatus.

The magnetic fluid bearing apparatus as applied to the present invention comprises a magnetic fluid sealing member which is formed in a housing, with the magnetic fluid sealing member including a rotating shaft extending into the housing, a permanent magnet mounted on the housing, and a magnetic fluid arranged in a clearance between the rotating shaft and the permanent magnet and provided in the housing. A magnetic field circuit is constituted by the magnetic fluid sealing member comprising the rotating shaft, the magnetic fluid, and the permanent magnet.

The magnetic fluid sealing member having the magnetic fluid is combined with a sliding bearing mounted o the housing and surrounded at an outer peripheral portion of the rotating shaft.

The present invention relates to an electric motor having a magnetic fluid bearing apparatus, with such a motor being suitable for a motor for driving a polygon mirror for a laser beam printer (LBP), for driving a magnetic disc in a magnetic disc apparatus, driving a photo disc in a photo disc apparatus, and a video tape recorder (VTR) etc.

Recently, for this type of motor having a magnetic fluid bearing apparatus, it is required that the motor have a high accurate rotation with a low shaft deflection and a low rotation number fluctuation, and with a high speed rotation for attaining a highly accurate picture quality and a high density for a recording.

Further, for this type of magnetic fluid bearing apparatus use in the motor, it is desirable to maintain a clean magnetic fluid bearing apparatus in which no contamination by an oil vapor discharged from the lubricating fluid etc. occur.

The problems relating to rotation accuracy and contamination of this type of motor are caused mainly by the bearing apparatus structure. Conventional ball bearing apparatus structure have limitations for attaining the high speed rotation and the high rotation accuracy in the motor due to processing accuracy in manufacturing the ball bearing apparatus structure components.

For these reasons as a bearing apparatus structure in the motor for obtaining a high speed rotation and a high accuracy rotation, a sliding bearing apparatus structure using a lubricating fluid is employed, and there are many improvements for use in the motor having the above stated sliding baring apparatus structure.

In particular, as the countermeasures for the oil leakage from the sliding bearing apparatus, a magnetic fluid sealing structure is employed in which a sealing structure for the oil can expect to carry out a complete sealing A magnetic fluid sealing structure of the aforementioned type in a motor having a magnetic fluid bearing apparatus comprises non-magnetic housing, a permanent magnet or a permanent magnet having a magnetic pole piece at an end face thereof is inserted into an opening end side portion of the housing, with the permanent magnet or the permanent magnet having the magnetic pole piece being arranged along an axial line of the housing, and with a permeable rotating shaft extending through the housing and arranged along the axial line of the housing. A lubricating fluid, such as a magnetic fluid, is arranged in a clearance formed between the rotating shaft and the permanent magnet or the permanent magnet having the magnetic pole piece.

The enclosed magnetic fluid seals the clearance between an outer peripheral portion of the rotating shaft and an inner peripheral portion of the permanent magnet or the permanent magnet having the magnetic pole piece. In accordance with the above stated magnetic fluid sealing structure comprising the rotating shaft, the permanent magnet or the permanent magnet having the magnet pole piece and the magnetic fluid, a magnetic field circuit is constituted in the housing of the motor.

Further, air in the housing is cubically expanded due to a heat generation in the bearing surrounding portion or due to a heat generation caused by the drive of the motor etc., thereby increasing an inner pressure in the housing.

With an increase of the inner pressure in the housing, a fluid film of the magnetic fluid, arranged between the outer peripheral portion of the rotating shaft and the inner peripheral portion of the permanent magnet, or the magnetic fluid sealing structure is destructed, the magnetic fluid scatters in the housing such as the bearing surrounding portion etc. resulting in a contamination of the magnetic fluid bearing apparatus by the scattered magnetic fluid.

For solving the above stated problems, in, for example, Japanese Patent Laid-Open No. 210560/1986, a motor is provided having an intake or suction opening provided on a housing so as to prevent the increase in inner pressure in the housing. The magnetic fluid sealing structure for the motor is combined with a ball bearing apparatus structure and, therefore, it is impossible to obtain the motor having the high speed rotation and the high rotational accuracy due to the ball bearing apparatus structure.

In the above stated prior art, the intake or suction opening prevents the increase in inner pressure in the housing, however, since the oil vapor from the lubricating oil, enclosed in the ball bearing portion, escapes toward an outside potion through the opening of the housing an original function of the magnetic fluid sealing structure is adversely affected.

U.S. Pat. No. 4,526,484 also proposes a magnetic fluid bearing apparatus in which the magnetic fluid sealing structure and a sliding bearing apparatus structure employing a magnetic fluid as a lubricating fluid are combined.

In the aforementioned United States patent, the magnetic fluid (ferro-lubricant) extends throughout as a reservoir on either side of generally radial or cylindrical thrust bearing surface and also an annular ring about an annular permanent magnet as a thin liquid film along the radial bearing surface. Therefore, the magnetic fluid bearing apparatus has no space in a housing between an outer peripheral portion of a rotating shaft and an inner peripheral portion of the annular permanent magnet.

In this magnetic fluid bearing apparatus, a high accuracy speed rotation can obtain by the sliding bearing apparatus structure according to the fluid lubrication and the leakage of the lubricating fluid can be prevented according to the magnetic fluid sealing structure.

In the above stated magnetic fluid bearing apparatus having the sliding bearing apparatus structure, the lubricating fluid itself is cubically expanded in the housing by the increase in temperature and there is the possibility that the magnetic fluid overflows from the magnetic fluid sealing structure and flows toward an outside of the housing.

It is undesirable for magnetic fluid to overflow from the magnetic fluid sealing portion due to the cubic expansion in the lubricating fluid, since at the high speed rotation, the magnetic fluid may scatter from the magnetic fluid sealing structure due to an increase in the centrifugal force acting on the magnetic fluid at the magnetic fluid sealing structure. However, no consideration has been given to this particular pattern.

SUMMARY OF THE INVENTION

An object of the present invention is to provide a magnetic fluid bearing apparatus and a motor having a magnetic fluid bearing apparatus wherein the motor is capable of achieving a high rotational speed or a highly accurate rotation in a magnetic fluid bearing apparatus.

Another object of the present invention is to provide a magnetic fluid bearing apparatus and a moor having a magnetic fluid bearing apparatus wherein a high fluid sealing characteristic property in a magnetic fluid bearing apparatus and a motor ca be effectively obtained.

A further object of the present invention is to provide a magnetic fluid bearing apparatus and a motor having a magnetic fluid bearing apparatus wherein the magnetic fluid bearing apparatus and the motor have an increased service life.

In accordance with the present invention, a magnetic fluid bearing apparatus comprises a cylindrical non-magnetic housing with a magnetic fluid sealing ember having an annular permanent magnet and a magnetic fluid mounted on the housing, and an annular end ring mounted on the housing and mounted on the magnetic fluid sealing member. A sliding bearing member is mounted on the housing, with a permeable rotating shaft mounted on the housing and extending through the magnetic fluid sealing member and the sliding bearing member. The end ring, the magnetic fluid sealing member and the sliding bearing member are sequentially arranged from an opening side portion of the housing, with magnetic fluid sealing member and the sliding bearing member being arranged at a predetermined interval A lubricating fluid is enclosed at a vicinity of the sliding bearing member.

In accordance with further features of the present invention, the non-magnetic housing is formed on a base member of an outer frame, with a bearing member being mounted on the housing, and a rotor, having a permeable rotating shaft, is rotatably supported by the bearing member. A stator is fixed to the rotating shaft, and the rotor is rotated at a high speed by being subjected to a magnetic field from the stator. A magnetic fluid sealing member having an annular permanent magnet and a magnetic fluid is mounted on the housing, with an annular end ring being mounted on the housing and mounted on the magnetic fluid sealing member. A sliding bearing member is mounted on the housing, and the rotating shaft is mounted on the housing and extends through the magnetic fluid sealing member and the sliding bearing member. The end ring, the magnetic fluid sealing member and the sliding bearing member are sequentially arranged from an opening side portion of the housing, and the magnetic fluid sealing member and the sliding bearing member are arranged with a predetermined interval, with a lubricating fluid being enclosed at a vicinity of the sliding bearing member.

A space is formed between the magnetic fluid sealing member and an inner peripheral portion of the housing, and a means for inducing a flow disturbance of the magnetic fluid in the magnetic fluid sealing member is provided on the rotating shaft or the end ring. The flow disturbance mean is disposed in opposition to the magnetic fluid sealing member, and the flow disturbance in the flow disturbance means is carried out as a result of a rotation of the rotating shaft.

By virtue of the features of the magnetic fluid bearing apparatus according to the present invention, the increase in the inner pressure in the housing is prevented by utilizing the rotation of the rotating shaft.

In other words, the magnetic fluid sealing member is disposed against the sliding bearing portion with an interval, and the space is constituted between the magnetic fluid sealing member and the sliding bearing portion. This space can absorb the cubic expansion in the lubricating fluid such as the magnetic fluid which is enclosed in the sliding bearing portion.

By utilizing the rotation of the rotating shaft, the sealing fluid film of the magnetic fluid is destroyed instantaneously, whereby an inner portion of the housing has a reduced pressure even with respect to the atmospheric pressure.

The end ring is provided on a near portion of the magnetic fluid sealing member so as not to scatter the magnetic fluid toward the outside portion of the housing, when the sealing fluid film of the magnetic fluid is instantaneously destroyed.

As an element or a means for instantaneously destroying the sealing fluid film of the magnetic fluid, the disturbance in a flow is imparted to the magnetic fluid itself or the magnetic fluid sealing film and an air passage is formed between the inner portion of the housing and the outside portion of the magnetic fluid sealing member, whereby the magnetic fluid sealing film is destroyed before the inner pressure in the housing increases to an unacceptable level.

An element or a means for disturbing the flow of the sealing fluid film of the magnetic fluid may, for example, include a projection member or a concave portion such as a groove provide don an outer peripheral portion of the rotating shaft positioned opposite to the magnetic fluid sealing member. The magnetic fluid sealing film is compulsively disturbed through the projection member or the concave portion of the rotating shaft, so that the magnetic fluid sealing film is destroyed under an appropriate inner pressure in the housing in dependence upon the fluid force.

Another element or means for disturbing the flow of the magnetic fluid sealing film may, for example, include a spiral shape groove provided on the inner peripheral portion of the end ring or on an outer peripheral portion of the rotating shaft positioned opposite to an inner peripheral portion of the end ring.

The axial direction fluid force is imparted to the magnetic fluid sealing film by utilizing the dynamic pressure of the spiral shape groove, the magnetic fluid sealing film is compulsively disturbed through the spiral shape groove, then the magnetic fluid sealing film is destroyed under an appropriate inner pressure in the housing according to this fluid force.

Further, so as to easily facilitate the destroying of the magnetic fluid sealing film, in the present invention, the clearance between the inner peripheral (diameter) portion of the permanent magnet and the outer peripheral portion of the rotating shaft is wider (0.3-0.5 mm) than the conventional clearance (0.1-0.1 mm) between the inner peripheral (diameter) portion of the permanent magnet and the outer peripheral portion of the rotating shaft.

Additionally, the inner peripheral (diameter) portion of the end ring is smaller than the inner peripheral (diameter) portion of the permanent magnet, whereby the fluid force in the axial direction spiral shape groove provided on the end ring or the rotating shaft can be increased.

In a vertical type motor for driving the polygon mirror for a laser beam printer (LBP)), in the magnetic fluid bearing apparatus, the end portion of the inner peripheral side of the end ring, arranged at the opening side of the housing, is positioned lower than the outer peripheral side of the end ring so that the magnetic fluid does not adhere to the housing, etc., even if the magnetic fluid overflows the end portion of the end ring.

In the magnetic fluid bearing apparatus according to the present invention, the magnetic fluid sealing member having the end ring and the sliding baring apparatus portion is positioned at a spaced interval with respect each other, and the space is provided between the magnetic fluid sealing member and the sliding bearing apparatus portion.

Even when the magnetic fluid sealing film is destroyed according to the present invention, the magnetic fluid sealing film is destroyed under the state in which the inner pressure in the housing has not increased to an appreciable level so that degree of scattering of the magnetic fluid is only slight.

The air in the space in the housing flows out when the magnetic fluid sealing film is destroyed, however the lubricating fluid enclosed in the sliding bearing apparatus portion, does not overflow. Accordingly, a clean magnetic fluid bearing apparatus can be obtained.

The spiral shape groove is provided on the inner peripheral portion of the end ring or on the outer peripheral portion of the rotating shaft. Therefore, even when the magnetic fluid sealing film is destroyed, and the magnetic fluid scatters and adheres to the end ring or to the rotating shaft, the adhering magnetic fluid can easily be recovered in the magnetic fluid sealing member.

According to the present invention, since the end ring is provided with the magnetic fluid sealing member and the increase in the inner pressure in the housing can be prevented by employing the rotation of the rotating shaft, the magnetic fluid bearing apparatus has a good sealing fluid characteristic property.

Moreover, the amount of evaporation of the oil vapor from the magnetic fluid sealing member can be restricted by narrowing the clearance formed between the inner peripheral portion of the end ring and the outer peripheral portion or the rotating shaft. As the space is formed between the sliding bearing apparatus portion and the magnetic fluid sealing member, it is unnecessary to closely adjust the enclosing amount for the lubricating fluid; therefore, the manufacturing cost in the mass production for the magnetic fluid bearing apparatus can be effectively reduced.

Even when the large amount of magnetic fluid is enclosed in the magnetic fluid sealing member, since the spiral groove is mounted on the end ring or the rotating shaft, the magnetic fluid is pushed toward the side of the sliding bearing apparatus portion by the fluid force due to the rotation of the rotating shaft and the magnetic fluid does overflow toward the outside portion of the housing.

The magnetic fluid sealing member and the sliding bearing apparatus portion are disposed with at an interval, in case of the vertical type motor, the lubricating fluid having the low viscosity is enclosed into the sliding bearing apparatus portion and the high viscosity lubricating fluid, having a small evaporation reduction amount, is enclosed into the magnetic fluid sealing member, respectively. Thus, the magnetic fluid bearing apparatus of the present invention has a low loss.

In accordance with the above stated various effects, the magnetic fluid bearing apparatus according to the present invention can be applied to a motor for driving the polygon mirror in which the high speed rotation, a highly accurate rotation and a high cleanliness are required, and a magnetic disc drive motor for use in the magnetic disc drive apparatus or the photo disc drive apparatus so that a long life, a high reliability, and a reduction in manufacturing cost can effectively be attained.

DESCRIPTION OF THE INVENTION

Figure 1:
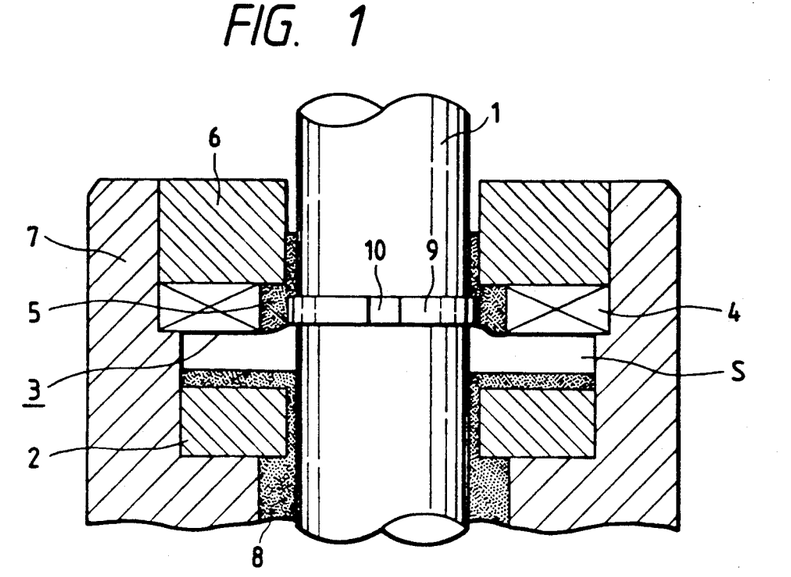
FIG. 1 is a partial cross-sectional view of one embodiment of a magnetic fluid bearing apparatus according to the present invention with the shaft in a non-rotating state.

Referring now to the drawings wherein like reference numerals are used throughout the various views to designate like parts and, more particularly, to FIG. 1, according to this Figure, magnetic fluid bearing apparatus in accordance with the present invention comprises mainly a permeable rotating shaft 1, a sliding bearing 2, an annular permanent magnet 4, an enclosed magnetic fluid 5, an annular end ring 6, a cylindrical non TM magnetic housing 7, and an enclosed lubricating fluid 8.

A magnetic fluid sealing member 3 comprises the non-magnetic housing 7 made of, for example, aluminum, the permanent magnet 4, and the magnetic fluid 5. The end ring 6 is made of a non-magnetic material and inserted into the housing 7. Further, the end ring 6 is mounted on and adheres to the magnetic fluid sealing member 3. The sliding bearing 2 is assured at a smooth lubricating operation through the enclosed lubricating fluid 8.

The magnetic fluid 5 is arranged so as to adhere closely and fill a clearance formed between an outer peripheral (diameter) portion of the rotating shaft 1 and an inner peripheral (diameter) portion of the permanent magnet 4 and also between the outer peripheral portion of the rotating shaft 1 and an inner peripheral (diameter) portion of he end ring 6.

Therefore, a magnetic fluid sealing film having the magnetic fluid 5 is formed between the outer peripheral portion of the rotating shaft 1 and the inner peripheral portion of the permanent magnet 4 and also between the outer peripheral portion of the rotating shaft 1 and the inner peripheral portion of the end ring 6.

The end ring 6 is mounted closely above on the permanent magnet 4. An inner diameter of the end ring 6 is made smaller than an inner diameter of the permanent magnet 4.

It is preferred to employ a non-magnetic material a the end ring 6, so as to effectively carry out the restoration for the magnetic fluid sealing film, when the magnetic fluid film is destroyed.

In particular, the material for the end ring 6 has a non-sticking characteristic property and, for example, may be Teflon, so as to increase above stated restoration of the magnetic fluid sealing film.

The lubricating fluid 8 may be a general use lubricating oil or may be a magnetic fluid, such as, for example, the same magnetic fluid as the magnetic fluid 5 of the magnetic fluid sealing member 3, whereby the operational integrity can be improved since no problem occurs as a result of a possible dilution of the magnetic fluid 5 due to an inclusion of the lubricating fluid 8 and the magnetic fluid 5.

The permanent magnet 4 is disposed on the sliding bearing 2 at a predetermined distance.

An annular ring-like shape space S, having a predetermined cubic volume, is formed on the level of the lubricating fluid 8 in the housing 7. The space S surrounds the outer peripheral portion of the rotating shaft 1 and an inner peripheral (wall) portion of the housing and includes a lower level formed by an upper surface level of the lubricating fluid 8, and an upper level formed by a lower surface portion of the permanent magnet 4 and a lower surface of the sealing film of the magnetic fluid 5.

This space S has a cubic volume dimension sufficient to receive the lubricating fluid 8 which expands in the housing 7 in accordance with an increase in temperature due to the rotation of the rotating shaft 1.

Figures 2, 3:
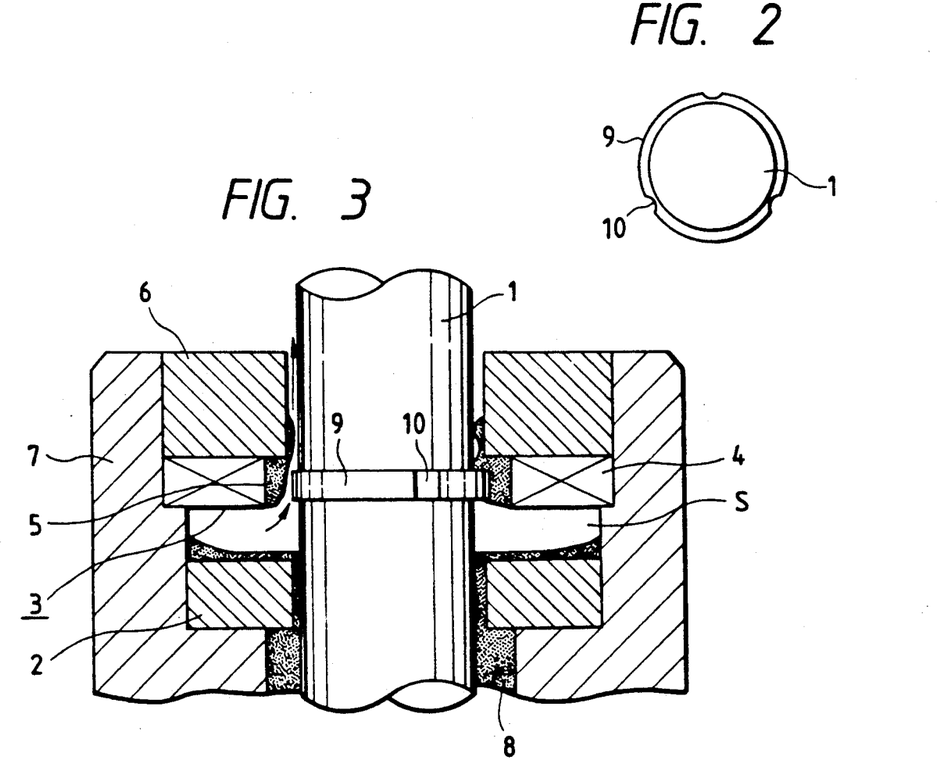
FIG. 2 is a top view showing a rotating shaft having a projection member with dent portions shown in FIG. 1.
FIG. 3 is a partial cross-sectional view of an embodiment of FIGS. 1 and 2 of a magnetic fluid bearing apparatus according to the present invention with the shaft in a rotating state.

A shown in FIG. 2, a ring-like shape projection member 9 is integrally formed in one piece with the rotating shaft 1. The projection member 9 of the rotating shaft 1 is disposed in opposition to the magnetic fluid sealing member 3. Three symmetrically arranged dent portions or grooves 10 are provided on the projection member 9 with the dent portions or grooves 10 being adapted to disturb the magnetic fluid 5 or the magnetic fluid sealing film in the magnetic fluid sealing member 3.

As can be readily appreciated the rotating shaft 1 may still be provided with one or more dent portions or grooves without providing a projection member or the rotating shaft 1 may merely be provided with a projection member without a dent portion or groove.

The condition of the magnetic fluid sealing member 3 shown in FIG. 1 indicates a state wherein the magnetic fluid sealing film is subject to an inner pressure in the housing 7, in other words, the height of the magnetic sealing member 3 is at a level assumed during a non-rotating condition of the rotating shaft 1.

As shown in FIG. 1, the magnetic fluid 5 is pushed toward a side of the end ring 6 according to the inner pressure in the space and is balanced by the inner pressure in the space S and the magnetic force by the permanent magnet 5. This inner pressure in the space S is generally increased by the volume expansion of the lubricating fluid 8 and the air in the housing 7 etc. due to the viscous friction heat generated in the sliding bearing 2, and the heat generated by the drive motor.

Further, in the magnetic fluid sealing member 3 according to the present invention, since the end ring 6 is provided, even if the magnetic fluid sealing film is destroyed and the magnetic fluid 5 scattered, the magnetic fluid 5 does not reach an outside portion of the housing 7 and the magnetic fluid 5 still adheres to the end ring 6 and the rotating shaft 1.

As a clearance between the inner peripheral (diameter) portion of the end ring 6 and the outer peripheral (diameter) portion of the rotating shaft 1 is a narrow clearance of about 0.1 mm, the magnetic fluid 5 hardly reaches the outside portion of the housing 7.

To ensure a destroying of the magnetic fluid sealing film through a comparatively low inner pressure in the space S, it is desirable for the clearance between the inner diameter of the permanent magnet 4 and the diameter of the rotating shaft 1 to be in a range of about 0.3–0.5 mm.

Furthermore, it is desirable for the clearance between the inner diameter of the permanent magnet 4 and the diameter of the rotating shaft 1 to be wider than the clearance between the inner diameter of the end ring 6 and the diameter of the rotating shaft 1.

Also, it is preferred for the clearance between the inner diameter of the end ring 6 and the diameter of the rotating shaft 1 to be extremely narrow so as to minimize the amount of evaporation of the magnetic fluid 5.

As shown in FIG. 3, when the rotating shaft 1 rotates, the magnetic fluid sealing film is disturbed by the projection member 9 provided on the rotating shaft 1. Then the magnetic fluid sealing film is destroyed and the air in the space S is discharged from the housing 7.

Namely, in the embodiment of FIG. 3, when the rotating shaft 1 rotates, the magnet fluid 5 can rotate and flow around the outer peripheral portion of the rotating shaft 1.

As to the velocity distribution of the magnetic fluid 5, the rotating or flowing magnetic fluid 5 has substantially the same rotational speed as the rotating shaft 1 at the outer peripheral portion of the rotating shaft 1 and is gradually decreased in a direction away from the rotating shaft 1 such that the rotational speed of the magnetic fluid 5 is zero at an inner peripheral portion of the permanent magnet 4 and at a inner peripheral portion of the end ring 6.

After the rotating shaft 1 rotates the flow of the magnetic fluid 5 is disturbed by the projection member 9 provided on the rotating shaft 1. The passage for discharging the air in the space S is formed in the magnetic fluid 5 from the inner portion of the space S to the outer portion of the magnetic fluid 5.

Then the air can enter into the air discharging passage and pass through the clearance formed between the outer peripheral portion of the rotating shaft 1 and the inner peripheral portion of the end ring 6, thereby discharging the air in the space S toward he outside portion of the housing 7.

By virtue of the disturbance in the magnetic fluid sealing film, the air in the space S passes through the air discharging passage, thereby inadvertently destroying the magnetic fluid sealing film due to the increase in the inner pressure in the housing 7.

When the inner pressure at the space S is substantially reduced with respect to the atmospheric pressure, the magnetic fluid 5 in the magnetic fluid sealing member 3 recovers due to the magnetic force of the permanent magnet 5 and, accordingly, the fluid sealing condition is maintained through the magnetic fluid sealing member 3.

Figure 4:
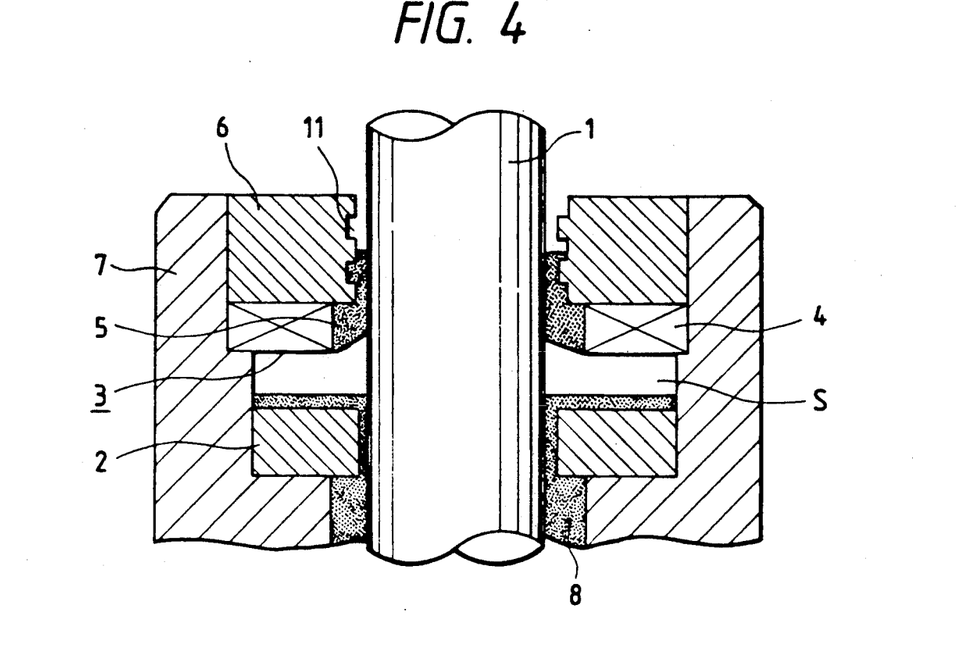
FIG. 4 is a partial cross-sectional view of another embodiment of a magnetic fluid bearing apparatus according to the present invention with the shaft in non-rotating state;
a FIG. 5 is a partial cross-sectional view of the embodiment of FIG. 4 of a magnetic fluid bearing apparatus with the shaft in a rotating state.

In FIG. 4, a magnetic fluid bearing apparatus comprises the annular end ring 6 having a spiral groove 11 integrally provided on an inner peripheral portion of the end ring 6. The spiral groove 11 is formed so as to transfer the magnetic fluid 5 toward a side of the sliding bearing 2 in accordance with the rotation of the rotating shaft 1.

The magnetic fluid sealing member 3 is disposed as shown in FIG. 4 such that the housing 7 is subjected to the inner pressure of the housing 7 during a non-rotating period of the rotating shaft 1 similar to that of shown in FIG. 1.

Figure 5:
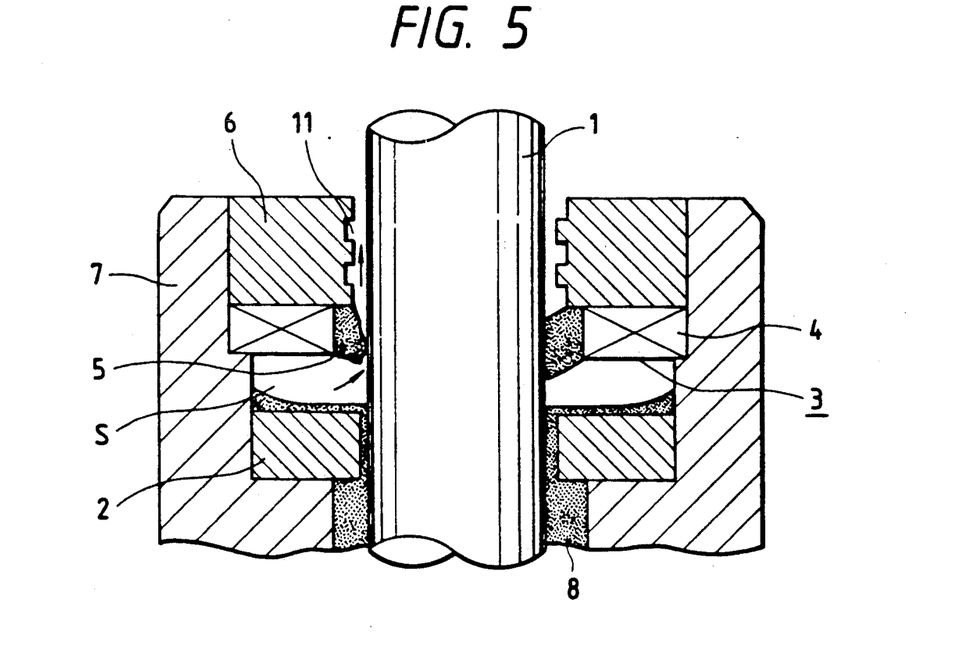

Upon rotation of the rotating shaft 1, the magnetic fluid 5 is pushed back by the spiral groove 11 toward a side of the sliding bearing 2 in accordance with an axial direction dynamic fluid force generated due to a relative movement of the spiral groove 11 and the rotating shaft 1, as shown in FIG. 5.

As shown in FIG. 5, during rotation of the rotating shaft 1, the inner pressure in the space S acts upon the magnetic fluid sealing member 3 to push the magnetic fluid 5 out toward the end ring 6, with the axial direction fluid force caused by the dynamic pressure action acting on the fluid sealing film of the magnetic fluid 5. The flow of the magnetic fluid 5 is disturbed and at the same time the magnetic fluid 5 of the magnetic fluid sealing film is destroyed due to this fluid force.

Then the passage is formed between the outer peripheral portion of the rotating shaft 1 and the inner peripheral portion of the magnetic fluid 5. The air in the space S passes through the air discharging passage and successively through the clearance which is formed between the outer peripheral portion of the rotating shaft 1 and the inner peripheral portion of the end ring 6 having the spiral groove 11. Thus the air is discharged toward the outside portion of the housing 7.

Then the inner pressure in the space S is lowered substantially to atmospheric pressure and the magnetic fluid 5 recovers in the magnetic fluid sealing member 3, thereby maintaining the fluid sealing condition through the magnetic fluid sealing member 3.

Figure 6:
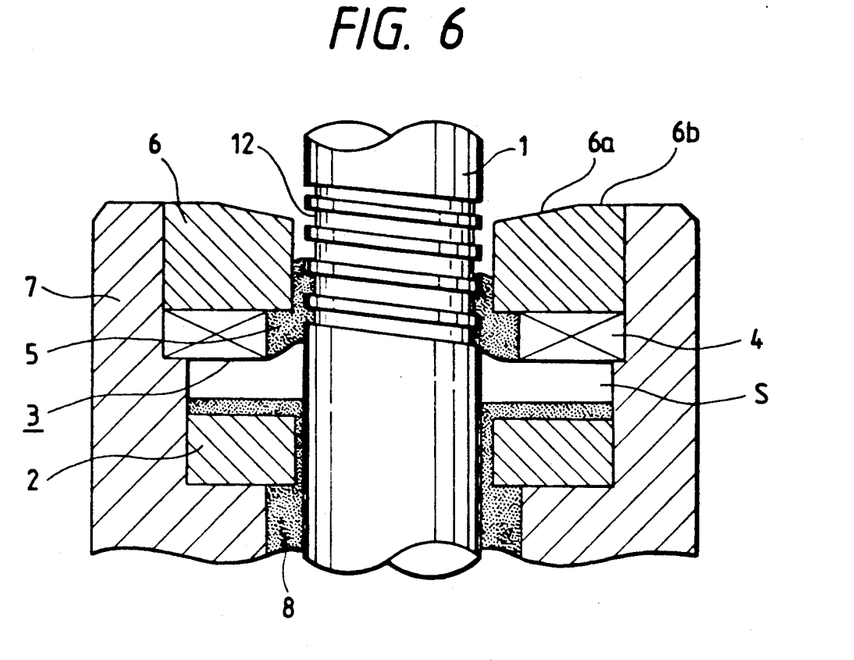
FIG. 6 is a partial cross-sectional view of a further embodiment of a magnetic fluid bearing apparatus according to the present invention with the shaft in a non-rotating state.

In FIG. 6, the magnetic fluid bearing apparatus comprises the rotating shaft 1 having a spiral groove 12 integrally provided on the rotating shaft 1 formed so as to transfer the magnetic fluid 5 toward the side of the sliding bearing 2 upon a rotation of the rotating shaft.

In FIG. 6, the annular end ring 6 has a smooth inclined upper surface portion 6a and a smooth flat upper surface portion 6b. The inclined portion 6a provided on the end ring 6 is formed to incline inwardly in a side of the rotating shaft 1.

Such an inwardly inclined portion 6a of the end ring 6 is provided so as not to cause the magnetic fluid 5 to flow directly to the outside portion of the housing 7, even if the magnetic fluid 5 flows toward the outer surface of the end ring 6. In particular, it is preferred to provide the inwardly inclined portion 6a at the end ring 6 in a case of the vertical type drive motor structure having the magnetic fluid bearing apparatus.

Figure 7:
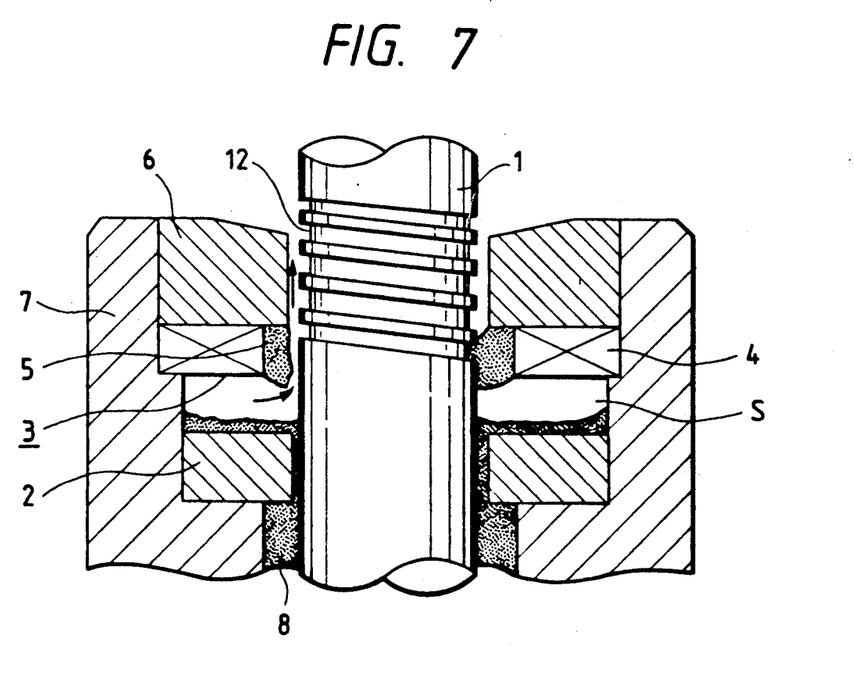
FIG. 7 is a partial cross-sectional view of the embodiment of FIG. 7 with the shaft in a rotating state.

With the shaft 1 rotating, as shown in FIG. 7, the magnetic fluid bearing apparatus inner pressure in the space S acts to form the magnetic fluid sealing member 3.

When the magnetic fluid 5 is pushed out toward the end ring 6, the axial direction fluid force is caused by the spiral groove 12 of the rotating shaft 1. The dynamic pressure action acts on the fluid sealing film of the magnetic fluid 5. The flow of the magnetic fluid 5 is disturbed and at the same time, the fluid sealing film of the magnetic fluid 5 is destroyed.

Then the passage is formed between the outer peripheral portion of the rotating shaft 1 and the inner peripheral portion of the magnetic fluid 5. The air in the space S passes through the air discharging passage and successively through the clearance forced between the outer peripheral portion of the rotating shaft 1' and the inner peripheral portion of the end ring 6. Thus, the air is discharged toward the outside portion of the housing 7.

Then the inner pressure in the space S in the housing 7 is lowered substantially to atmospheric pressure and the magnetic fluid 5 recovers in the magnetic fluid sealing member 3, thereby maintaining the fluid sealing condition through the magnetic fluid sealing member 3.

Figure 8:
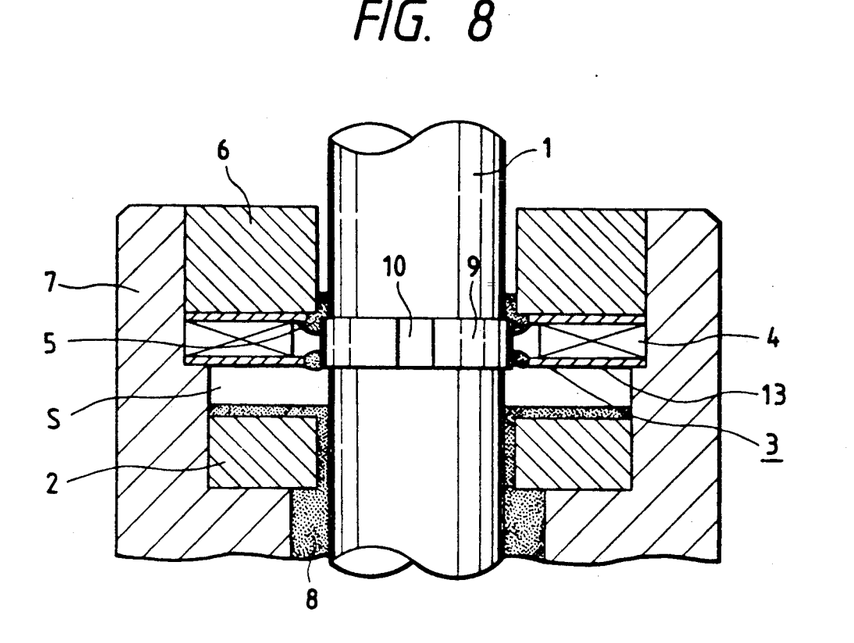
FIG. 8 is a partial cross-sectional view of yet another embodiment of a magnetic fluid bearing apparatus according t the present invention with the shaft in a non-rotating state.

In FIG. 8, the magnetic fluid bearing apparatus comprises the rotating shaft 1, the sliding bearing 2, the annular permanent magnet 4 having a magnetic pole piece 13, the magnetic fluid 5, the annular end ring 6, the housing 7, and the lubricating fluid 8. The magnetic fluid sealing member 3 comprises the housing 7, the permanent magnet 4 having the magnetic pole piece 13, and the magnetic fluid 5.

In the embodiment of FIG. 8, the rotating shaft 1 comprises the projection member 9 having dent portion or grooves 10 similar to the embodiment of FIGS. 1-3.

Figure 9:
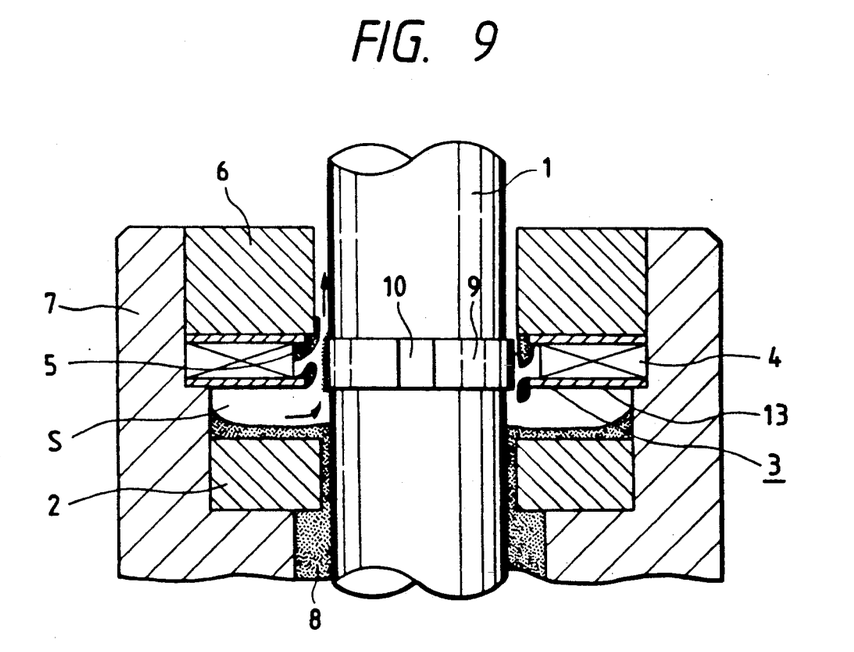
FIG. 9 is a partial cross-sectional view of the embodiment of FIG. 8 with the shaft in a rotating state.

The magnetic fluid bearing apparatus of FIGS. 8 and 9 have the same operations and effects as the magnetic fluid bearing apparatus structure of FIGS. 1-3.

Figure 10:
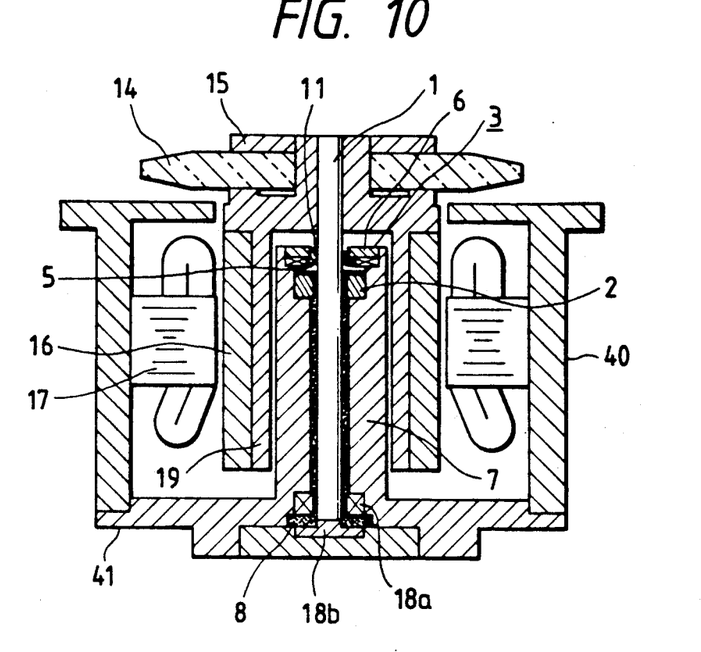
FIG. 10 is a longitudinal cross-sectional view of a motor for driving a polygon mirror to which a magnetic fluid bearing apparatus according to the present invention is applied.

As shown in FIG. 10, a motor for driving a polygon mirror for a laser beam printer (LBP) comprises a rotatable shaft 1, a collar 19, a polygon mirror 14 fixed to the collar 19 by a mirror supporting member 15, and a motor rotor 16 includes a permanent magnet inserted to the collar 19. The rotating shaft 1 is rotatably supported by a radial bearing 18a and a thrust bearing 18b.

The housing 7 is integrally formed with a base member 41 of an outer frame 40. The bearings 18a and 18b are installed in the housing. The magnetic fluid sealing member 3 is installed in the housing 7 at a side of an opening of the housing 7.

The magnetic fluid sealing member 3 is in the embodiment of FIG. 10 substantially similar to the magnetic fluid sealing member of the embodiment in FIGS. 4 and 5. Namely, the annular end ring 6 of the magnetic fluid sealing member 3 has the spiral groove at the inner peripheral portion thereof. The sliding bearing 2 is mounted on the upper portion of the housing 7 and surrounds the outer peripheral portion of the rotating shaft 1.

The polygon mirror 14 is driven by an electromagnetic force of a magnetic field of motor stator 17 and is adapted to be rotated at a rotational speed in the range of, for example, 10,000-30,000 rpm.

In operation, the magnetic fluid 8, enclosed in the bearing portion, ensures a smooth lubrication by the fluid. The space is formed between an upper portion of the magnetic fluid 8 and a lower portion of the magnetic fluid sealing member 3.

When the motor rotates at a high speed, the magnetic fluid 8 and the air in the space respectively carry out cubical expansions due to a heat generated by the motor and a heat generation by friction in the bearing portion.

The inner pressure at the space in the housing increases, however, the fluid sealing film of the magnetic fluid sealing member 3 is instantaneously destroyed at a comparative low pressure and such a fluid sealing film is immediately restored. Therefore, the fluid sealing characteristic property for the magnetic fluid sealing member 3 is effectively maintained.

If the polygon mirror 14 is contaminated by the oil vapor etc., the laser beam light is not transmitted to a photosensitive drum.

However, at the normal rotational speed of the motor, since a good fluid sealing characteristic property for the magnetic fluid sealing member 3 is maintained, the polygon mirror 14 is not contaminated by the oil vapor etc.

Since the magnetic fluid 8 having a low evaporation pressure is employed as the lubricating fluid, the amount of the lubricating oil which evaporates is extremely small and the contamination problem of the polygon mirror 14 can be solved.

The above stated magnetic fluid bearing apparatus according to the present invention employs the sliding bearing structures, so that the rotation for the motor can be made smoother in comparison with the conventional bal bearing structure.

Even at a high rotational speed of the motor, the shaft deflection of he rotating shaft 1 can be decreased and a highly accurate rotation can be maintained. As stated above, since the magnetic fluid sealing member 3 having a high fluid sealing characteristic property can be maintained, a high reliability in the motor for driving the polygon mirror 134 can be provided.

Figure 11:
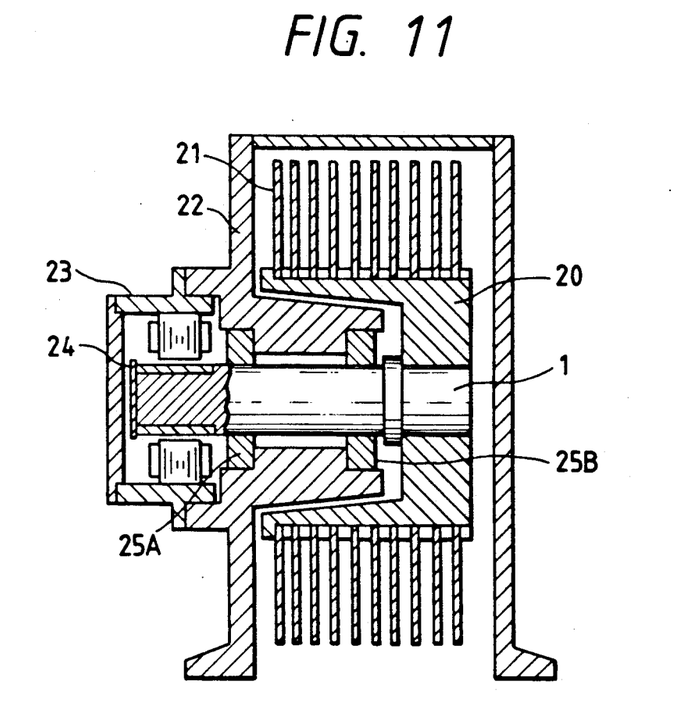
FIG. 11 is a longitudinal cross-sectional view of a magnetic disc drive apparatus having a motor to which a magnetic fluid bearing apparatus according to the present invention is applied.

In a magnetic disc drive apparatus shown in FIG. 11, two magnetic fluid bearing apparatuses 25A and 25B are installed in an outer frame 22. The magnetic fluid bearing apparatuses 25A and 25B respectively rotatively freely support he rotating shaft 1. A motor rotor 24 and a hub 20 are fixed to the rotating shaft 1, and the rotating shaft 1 is driven by a rotation magnetic field of a motor stator 23. The hub 20 provides a plurality of magnetic discs 21 which are magnetic recording mediums.

In case of the magnetic disc drive apparatus, when the leakage of the oil vapor etc. is generated in the magnetic fluid bearing apparatuses 25A and 25B, the magnetic disc 21 is contaminated interfering with the recording into the magnetic disc 21, so that it is essential that a clean magnetic fluid bearing apparatus in the magnetic disc drive apparatus is provided.

Each of the magnetic fluid bearing apparatuses 25A and 25B comprises the housing, the annular permanent magnet, the annular end ring having a spiral groove, the radial baring constituted integrally with the housing, and the magnetic fluid. The rotating shaft 1 extends into both the magnetic fluid bearing apparatuses 25A and 25B.

Figure 12:
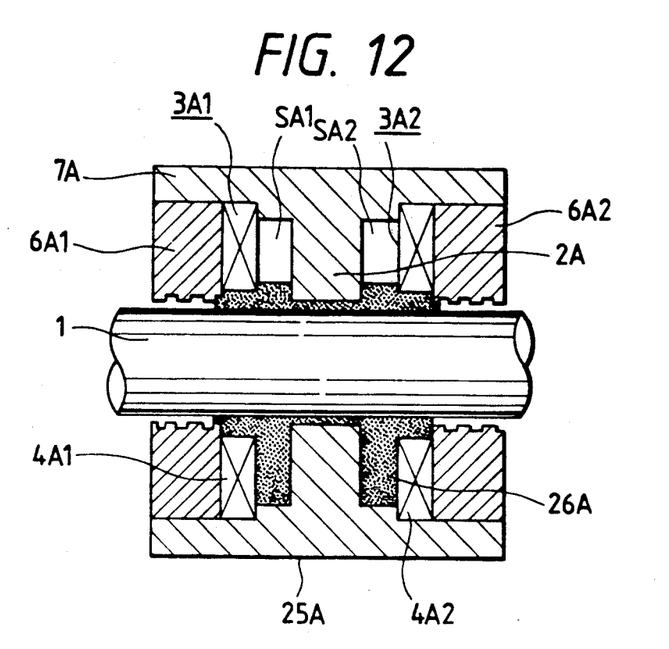
FIG. 12 is a longitudinal cross-sectional view of a magnetic fluid bearing apparatus for a magnetic disc drive apparatus, with the shaft in a non-rotating state.

As to one of the magnetic fluid bearing apparatuses 25A, as shown in FIG. 12, two magnetic fluid sealing members 3A1 and 3A2 are disposed between two annular end rings 6A1 and 6A2 in the housing 7A, respectively. Each of two end rings 6A1 and 6A2 respectively has the spiral groove at the inner diameter portion thereof. The rotating shaft 1 is covered entirely by a magnetic fluid 26A at the portion of the magnetic fluid sealing members 3A1 and 3A2. The sliding bearing 2A is disposed between two annular permanent magnets 4A1 and 4A2.

The fluid sealing film of the magnetic fluid 26A is formed between the inner portion of the housing 7A, the sliding bearing 2A, and two permanent magnets 4A1 and 4A2. Two spaces SA1 and SA2 are formed between the upper level of the magnetic fluid 26A, the inner portion of the housing 7A, the sliding bearing 2A, and the permanent magnets 4A1 and 4A2 with each of the two spaces SA1 and SA2 having a semicylindrical-like shape form.

The structure of magnetic fluid bearing apparatus 25B is substantially the same as the structure of the magnetic fluid bearing apparatus 25A.

Figure 13:
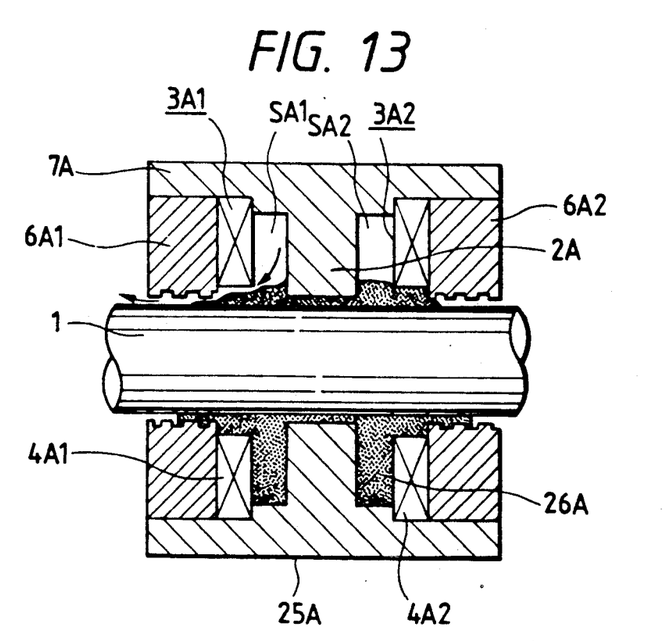
FIG. 13 is a longitudinal cross-sectional view showing one embodiment of the magnetic fluid bearing apparatus of FIG. 12, with the shaft in a rotating state.

As shown in FIG. 13, upon rotation of the rotating shaft 1, the inner pressures a the spaces SA1 and SA2 act on the magnetic fluid sealing members 3A1 and 3A2, respectively. When the magnetic fluid 26A is pushed out toward the end rings 6A1 and 6A2, the fluid force is caused by the spiral grooves of the end rings 6A1 and 6A2.

The flow of the magnetic fluid 26A is disturbed and the same time the fluid sealing film of the magnetic fluid 26A is destroyed. The passage is formed between the inner peripheral portion of the permanent magnet 4A1 and the outer peripheral portion of the magnetic fluid 26A. The air at the space SA1 passes through this air discharging passage and successively through the clearance formed between the outer peripheral portion of the rotating shaft 1 and the inner peripheral portion of the end ring 6A1. Thus air is discharged toward the outside of the housing 7A.

Then the inner pressure in the space SA1 in the housing 7A is lowered substantially to atmospheric pressure and the magnetic fluid 26A recovers in the magnetic fluid sealing member 3A1 thereby maintaining the fluid sealing condition through the magnetic fluid sealing member 3A1.

It is also possible for the construction of the embodiments of FIGS. 11-13, to be employed with a photo disc as a photo recording medium in place of the polygon mirror or the magnetic disc, and thereby provide a photo disc drive apparatus for the photo disc. The photo disc drive apparatus can attain operation and the effects similarly those of the construction of FIGS. 11-13.

Therefore, in the magnetic fluid bearing apparatus according to the present invention, a clean and a high reliability magnetic or photo disc drive apparatus having a highly accurate rotation by the sliding bearing and a good fluid sealing characteristic property can be obtained.

We claim:

1. A magnetic fluid bearing apparatus comprising:
   a cylindrical non-magnetic housing;
   a magnetic fluid sealing member having an annular permanent magnet and a magnetic fluid mounted on said housing;
   an annular end ring mounted on said housing and mounted on said magnetic fluid sealing member;
   a sliding bearing member mounted in said housing;
   a permeable rotating shaft mounted in said housing and extending through said magnetic fluid sealing member and said sliding bearing member;
   a lubricating fluid enclosed in a vicinity of said sliding bearing member;
   said end ring, said magnetic fluid sealing member and said sliding bearing member being successively arranged from an opening side portion of said housing;
   said magnetic fluid sealing member and said sliding bearing member being arranged at a predetermined interval;
   a space formed between said magnetic fluid sealing member and an inner peripheral portion of said housing; and
   flow disturbance means for imparting a disturbance in a flow of said magnetic fluid in said magnetic fluid sealing member, said flow disturbance means being provided on said end ring to oppose outward flow of magnetic fluid of said magnetic fluid sealing member,
   wherein a disturbance in the flow of said magnetic fluid is effected upon a rotation of said rotating shaft.

2. A magnetic fluid bearing apparatus according to claim 1, wherein said flow disturbance means comprises a spiral shaped groove formed on an inner peripheral portion of said end ring.

3. A magnetic fluid bearing apparatus according to claim 1, wherein said annular end ring has an inner diameter which effects a spacing with an outer periphery of said rotating shaft that is less than both an inner diameter of said permanent magnet and inner diameter of said housing.

4. A magnetic fluid bearing apparatus according to claim 1, wherein said end ring is made of non-magnetic material.

5. A magnetic fluid bearing apparatus according to claim 1, wherein an inner diameter of said end ring is less than an inner diameter of said permanent magnet.

6. A magnetic fluid bearing apparatus according to claim 1, wherein said lubricating fluid is a magnetic fluid.

7. A motor having a magnetic fluid bearing apparatus comprising:
   a non-magnetic housing formed on a base member of an outer frame;
   a bearing member mounted on said housing;
   a rotor having a permeable rotating shaft and rotatably supported by said bearing member;
   a stator fixed to said rotating shaft, said rotor being rotated at a high speed and being acted upon by a magnetic field from said stator;
   a magnetic fluid sealing member having an annular permanent magnet and a magnetic fluid mounted on said housing;
   an annular end ring mounted on said housing and mounted on said magnetic fluid sealing member;
   a sliding bearing member mounted on said housing;
   a lubricating fluid enclosed in a vicinity of said sliding bearing member;
   said rotating shaft being mounted in said housing and extending through said magnetic fluid sealing member and said sliding bearing member;
   said end ring, said magnetic fluid sealing member and said sliding bearing member are successively arranged from an opening side portion of said housing;
   said magnetic fluid sealing member and said sliding bearing member are arranged at a predetermined interval;
   a space formed between said magnetic fluid sealing member and an inner peripheral portion of said housing; and
   flow disturbance means for imparting a disturbance in a flow of said magnetic fluid in said magnetic fluid sealing member, said flow disturbance means being provided on said end ring to oppose outward flow of magnetic fluid of said magnetic fluid sealing member,
   wherein a disturbance in the flow of said magnetic fluid is effected upon a rotation of said rotating shaft.

8. A motor having a magnetic fluid bearing apparatus according to claim 7, wherein said motor is adapted to drive at least one of a polygon mirror, a disc of a magnetic recording medium, and a disc of photo recording medium.

9. A motor having a magnetic fluid bearing apparatus according to claim 7, wherein said rotating shaft is a vertical type rotating shaft.

10. A motor having a magnetic fluid bearing apparatus comprising:
    a cylindrical non-magnetic housing formed on a frame;
    a bearing member mounted on said housing;
    an annular end ring mounted on said housing;
    a permeable rotating shaft rotatably supported by said bearing member;
    a load fixed to said rotating shaft;
    means for imparting a force to said rotating shaft;
    a sliding bearing member mounted on said housing;
    a lubricating fluid enclosed at a vicinity of said sliding bearing member;
    said rotating shaft is mounted in said housing and extends through said magnetic fluid sealing member and said sliding bearing member;
    said end ring, said magnetic fluid sealing member and said sliding bearing member are successively arranged from an opening side portion of said housing;

said magnetic fluid sealing member and said sliding bearing member are arranged at a predetermined interval;

a space formed between said magnetic fluid sealing member and an inner peripheral portion of said housing; and flow disturbance means for imparting a disturbance in a flow of said magnetic fluid in said magnetic fluid sealing member, said flow disturbance means being provided on said end ring to oppose outward flow of magnetic fluid of said magnetic fluid sealing member, wherein a disturbance in the flow of said magnetic fluid is effected upon a rotation of said rotation shaft.

11. A motor having a magnetic fluid bearing apparatus according to claim 10, wherein said rotating shaft is operatively connected to at least one of a magnetic recording medium and a photo recording medium.

12. A motor having a magnetic fluid bearing apparatus according to claim 10, wherein said end ring comprises at least a pair of end rings, and said motor is horizontal type motor.

13. A motor having a magnetic fluid bearing apparatus according to claim 10, wherein said lubricating fluid is a magnetic fluid.

* * * * *